May 14, 1946. W. B. KLEMPERER 2,400,152
TELL-TALE
Filed July 9, 1945 3 Sheets-Sheet 1

INVENTOR.
WOLFGANG B. KLEMPERER,
BY
ATTORNEY.

May 14, 1946.　　W. B. KLEMPERER　　2,400,152
TELL-TALE
Filed July 9, 1945　　3 Sheets-Sheet 2

INVENTOR.
WOLFGANG B. KLEMPERER,
BY
ATTORNEY.

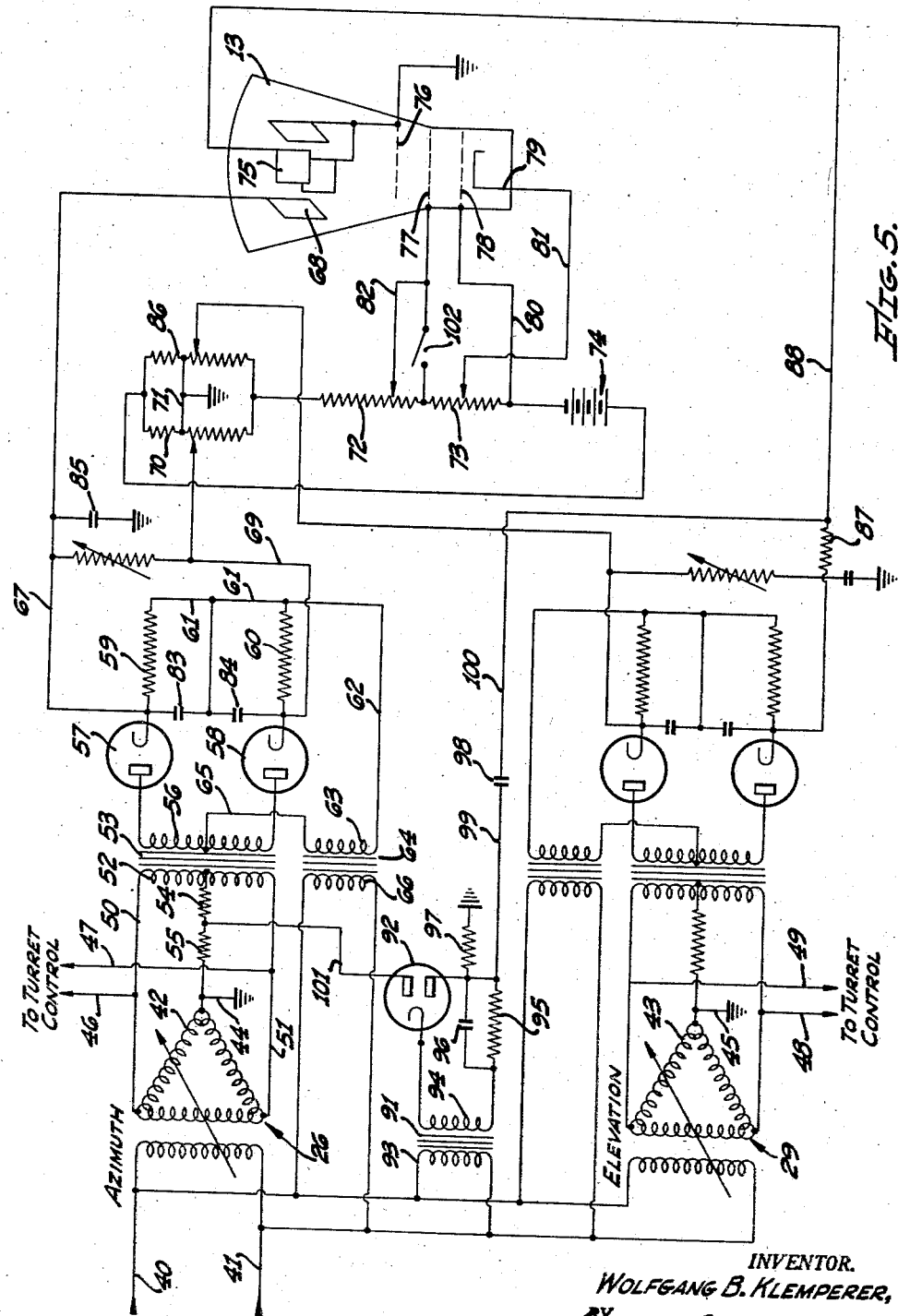

Patented May 14, 1946

2,400,152

UNITED STATES PATENT OFFICE 2,400,152

TELLTALE

Wolfgang B. Klemperer, West Los Angeles, Calif.

Application July 9, 1945, Serial No. 603,870

14 Claims. (Cl. 177—311)

This invention relates to an apparatus for indicating to the pilot of an aircraft the position of a mechanically movable piece of equipment on the aircraft and not within the field of the pilot's vision, and has particular reference to an apparatus for indicating to the pilot the aiming direction of a movable gun mounted at the rear of the aircraft and operated by an independent gunner.

This application is a continuation-in-part of a copending application Serial No. 438,785, filed by Wolfgang B. Klemperer on April 13, 1942, and entitled "Tell-tale."

It is an accepted fact that in aerial combat an aeroplane is most vulnerable when attacked from the rear. Accordingly many efforts have been made to provide an improved tail protection. The most effective means thus far employed has consisted of one or more movable guns capable of being directed to the rear. In many instances these guns are mounted forward of the empennage or tail structure with the result that there exists in the rearward hemisphere a "blind" spot or obstructed area.

The present invention takes cognizance of these facts and overcomes, to a large degree, the undesirable features of armament placed forward of the empennage in that the apparatus comprising the invention indicates to the pilot of a military aircraft the position or aiming direction of remotely disposed armament controlled and operated by an independent gunner in order to enable the pilot to tactically cooperate with the gunner in bringing the fire power of the aircraft armament effectively to bear upon enemy aircraft in aerial combat through so maneuvering the aircraft as to keep the empennage out of the desired line of fire of the guns.

Since the advent of rearwardly firing guns placed on an aircraft forward of the empennage, it has not been uncommon for a gunner in the excitement of combat and while following his target and his gun sights to accidentally shoot into the tail of his own aeroplane. To overcome this, devices have been developed which prevent the gunner from moving the gun so that it can be pointed at the tail or which prevent the gun from being fired whenever the structural parts of the aeroplane come within the field of fire. Such interrupters serve the purpose for which they are intended but, from a tactical standpoint, the occurrence of the blind spot requiring cessation of fire gives the enemy aircraft an opening to attack.

It is, therefore, an object of this invention to provide an apparatus for indicating to the pilot of an aircraft when his remotely located gunner wishes to shoot in a field obstructed by a portion of his craft so that he may maneuver his craft to clear the desired field of fire.

It is also an object of this invention to provide an apparatus of the character set forth in the preceding paragraph which indicates to the pilot in two dimensions the training direction of the gun.

It is an additional object of this invention to provide a single instrument through which a plurality of informational items are transmitted in order to minimize the number of instruments which an already over-burdened pilot has to observe.

It is a still further object of this invention to provide an apparatus of the character set forth in the preceding paragraphs which serves to indicate to the pilot whether or not his remotely located gunner is actually aiming the gun.

It is also an object of this invention to provide an apparatus of the character set forth hereinbefore in which means is provided for indicating to the pilot whether the associated gun is aimed in the forward hemisphere or in the rear hemisphere.

It is an additional object of this invention to provide an apparatus of the character set forth in the preceding paragraphs which is so constructed and arranged as to permit it to be cooperatively adapted to existing gun turret driving and control mechanisms.

Other objects and advantages of this invention will be apparent from the study of the following specifications, read in connection with the accompanying drawings, wherein:

Fig. 5 is a wiring diagram illustrating in detail the electrical apparatus and connections employed in the indicating apparatus.

Figure 1:
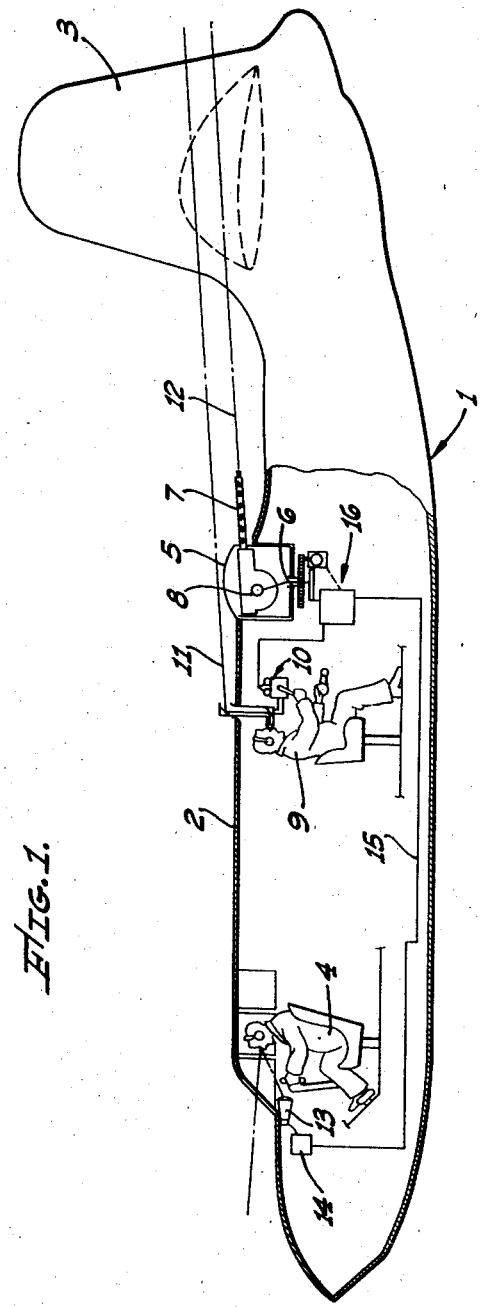
Fig. 1 is a sectional side elevational view of an aeroplane showing diagrammatically the apparatus of the invention as applied to a movable turret having a remotely located sighting mechanism and controls cooperatively linking the sighting mechanism with the turret drive mechanism.

Referring to the drawings, there is illustrated diagrammatically in Fig. 1 an aeroplane 1 including a fuselage 2 and an empennage 3. The pilot of the craft represented at 4 is seated in the forward part of the plane and, of course, faces in a forward direction. Between the pilot and the empennage there is mounted a gun turret 5 arranged to rotate about a vertical axis 6 and carrying one or more machine guns or small cannon 7 arranged to revolve with the turret 5 about the vertical axis 6 for training in azimuth and mounted also for rotation within the turret about a horizontal axis 8 for training in elevation.

The turret is arranged to be operated by a gunner represented at 9 who is ordinarily seated before a sighting and turret control mechanism indicated generally at 10. The sighting mechanism 10 includes suitable optical apparatus for directing a sighting line 11 at an approaching target. The sighting mechanism is movable to allow the sighting line 11 to be kept on a moving target.

Figure 4:
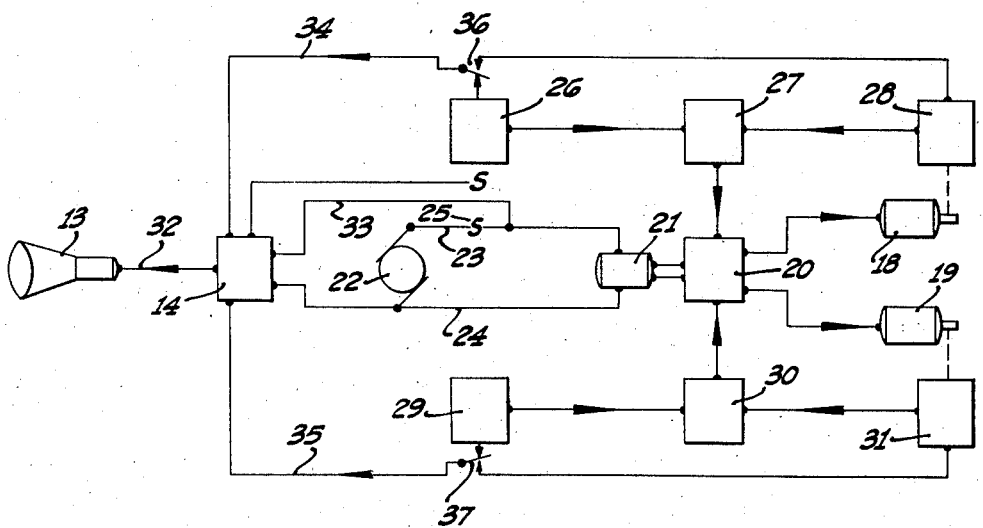
Fig. 4 is a block diagram illustrating the mode of operation of a conventional type of gun turret control, and illustrating the manner in which the indicating apparatus of the invention may be connected to such existing control mechanism.

The turret control mechanism illustrated diagrammatically in Fig. 4 cooperatively interconnects the sighting apparatus 10 with driving motors for moving the turret 5 in azimuth and for moving the guns 7 in elevation, the apparatus operating to cause the line of fire 12 of the guns to closely follow the movements of the sighting line 11.

Illustrated also in Fig. 1 is a pilot's indicator 13 preferably mounted on the instrument panel of the plane in a position to be readily and continuously observed by the pilot during his control of the aircraft. This indicator is coupled to a driving mechanism represented at 14, which driving mechanism is electrically connected as represented by the line 15 to the turret drive mechanism indicated generally at 16.

The form of the invention which has been chosen for illustration in this application is one which is adapted for use with a turret control system of the character indicated diagrammatically in Fig. 4. As is shown therein, driving motors 18 and 19 are employed for moving the turret and gun in azimuth and elevation, respectively. These motors are coupled through an "Amplidyne" unit 20. This unit is in the nature of a generator, deriving power by a mechanical connection to an electric motor 21 which is in turn driven from a suitable source of power represented in Fig. 4 by the alternator 22. The alternator 22 is connected to the motor 21 by conductors 23 and 24, the former being switched by a switch 25 employed to place the turret control apparatus in and out of operation.

The Amplidyne unit 20 is controlled by position measuring devices in such way as to apply to the driving motors 18 and 19 driving power proportional to the difference between the direction of the sighting line 11 and the aiming or firing line 12 of the guns 7. This is accomplished by employing "Selsyn" position indicators 26, 27 and 28 for the azimuth control and similar instruments 29, 30 and 31 for elevation control. The Selsyns 26 and 29 are moved directly by the sighting mechanism 10 in azimuth and elevation, respectively, whereas the Selsyns 28 and 31 are moved directly by the turret and gun in azimuth and elevation, respectively. The Selsyns 27 and 30 are of the well known differential type serving to produce an output which is proportional to the difference in the positions of the Selsyns 26, 28, and 29, 31, respectively. The output of the Selsyns 27 and 30 are coupled to the Amplidyne unit 20 to thereby control the operation of the Amplidyne unit in the manner previously described. Thus the gun is synkinesized with the sighting apparatus through the medium of the Selsyn instruments, the Amplidyne unit and the driving motors.

There is illustrated in Fig. 4 the indicating apparatus of this invention as including the indicator 13 operatively coupled, as represented by the line 32, to the control apparatus represented by the rectangle 14. Power input for the control apparatus 14 is derived from the conductor 24 and a conductor 33 connected to the load side of the switch 25. Controlling signals are conveyed to the apparatus 14 as represented by the lines 34 and 35, these lines being connectable as represented diagrammatically by the double-throw switches 36 and 37 to the Selsyns 26 and 29 or, alternatively, to the Selsyns 28 and 31 so that with the switches in the position shown, the indicator 13 indicates the direction of the line of sight 11, whereas with the switches 36 and 37 thrown to the opposite position, the indicator will indicate the direction of the line of fire 12.

The indicator 13 comprises, by preference, a cathode ray oscilloscope of conventional construction. For indicating purposes the oscilloscope is modified by the addition to the face or screen 38 (see Figs. 2 and 3) of an outline or vignette 39 representing the sighting area obstructed by the empennage 3 as viewed from the turret and sight position.

The manner in which the cathode ray oscilloscope is operated to transmit to the pilot the necessary information will be apparent from a consideration of Fig. 5 which is a detailed wiring diagram showing the apparatus and electrical connections heretofore represented and described as the control apparatus 14. In Fig. 5 there have been indicated diagrammatically two Selsyn units identified by the legends "azimuth" and "elevation," respectively, it being understood that these represent the Selsyns 26 and 29 when the switches 36 and 37 are thrown to the positions shown in Fig. 4 and that they alternatively represent the Selsyns 28 and 31 when the switches 36 and 37 are thrown to the opposite position.

These Selsyns have been identified generally in Fig. 5 by the reference characters 26 and 29. Each of these Selsyns includes a primary winding which is connected to be energized from the alternator 22 as by means of conductors 40 and 41. The Selsyns also include three-phase secondary windings 42 and 43, respectively. One of the terminals of each of these windings is grounded as indicated at 44 and 45 and the remaining two terminals are extended by means of conductors 46, 47 and 48, 49 to the differential Selsyns 27 and 30 of Fig. 4, such extension being indicated by the legends "to turret control" in Fig. 5.

Considering first the apparatus for indicating the azimuth projection of the aiming direction of the gun, it will be seen that the ungrounded terminals of the secondary winding 42 are also connected by conductors 50 and 51 to opposite terminals of a primary winding 52 of a transformer 53. The winding 52 is center-tapped and the center-tap is returned to ground through resistances 54 and 55. The transformer 53 includes a secondary winding 56, opposite terminals of which are connected to the anodes of the rectifiers 57 and 58, respectively. The cathode of the rectifier 57 is connected to a load resistance 59 and the cathode of the rectifier 58 is connected to a load resistance 60. The opposite ends of these load resistances are interconnected as by conductors 61 and connected, as by a conductor 62, to one terminal of a secondary winding 63 of a phasing transformer 64. The opposite terminal of the winding 63 is connected as by conductor 65 to the center-tap of the winding 56.

The transformer 64 includes a primary winding 66 which is connected to the source of power represented by conductors 40 and 41. The cathode of the rectifier 57 is connected by a conductor 67 to a deflection plate 68 of the cathode ray tube 13, the tube being positioned so that varying the potential on the deflection plate 68 moves the cathode ray beam laterally.

The cathode of the rectifier 58 is connected by a conductor 69 to the movable arm portion of a potentiometer 70. This potentiometer is grounded at one point as indicated at 71 and is connected in a series circuit with potentiometers 72 and 73. The three series connected potentiometers are in turn connected across a suitable source of direct potential for operating the cathode ray oscilloscope 13, such a source being represented in Fig. 5 by the battery 74.

The cathode ray tube 13, in addition to the deflection plate 68, includes also a vertical deflection plate 75, an accelerating anode 76, a focusing grid 77, a control grid 78 and a cathode 79. Suitable operating potentials for these electrodes are obtained by grounding the accelerating anode 76, connecting the control grid 78 as by conductor 80 to the negative terminal of the battery 74, connecting the cathode 79 as by conductor 81 to the movable arm 73, and connecting the focusing anode as by conductor 82 to the movable arm of the potentiometer 72. The potentiometer 73 thus serves as an intensity control by varying the negative bias on the control grid 78 with respect to the cathode 79. Similarly the potentiometer 72 operates as a focusing control to adjust the diameter of the spot produced on the screen by the impact of the cathode ray beam therewith. The potentiometer 70 serves as a centering control for centering the cathode ray spot laterally of the screen when the gun is pointing directly aft.

The circuit just described is arranged to produce a movement of the spot on the cathode ray tube screen from left to right as the gun is moved from an extreme left deflection to an extreme right deflection. The Selsyn device 26 is so positioned that the voltage between conductors 61 and 62 is a maximum when the gun is pointing in a direction at right angles to the fore and aft line, and is zero at the time the gun is pointing either fore or aft. A corresponding voltage is applied to the rectifiers 57 and 58 but is shifted by the addition thereto of the voltage developed in the phasing transformer winding 63 so that the rectified voltages appearing across the load resistors 59 and 60 are equal only when the gun is pointing directly forward or directly aft.

At one side of such a position the voltage across the load resistance 59 is greater than that across the load resistance 60 and the converse is true when the gun is pointed to one side of the fore and aft line. This voltage is applied by the conductor 67 to the deflection plate 68 and serves to move the cathode ray spot correspondingly. Alternating current components remaining in the rectified potential are filtered out by filter condensers 83, 84 and 85. A similar arrangement is employed for the movement of the spot vertically to record movements of the gun in elevation, there being provided a centering potentiometer 86 connected in parallel with the centering potentiometer 70, the output of the elevation rectifiers being coupled through a resistance 87 and conductor 88 to the vertical deflection plate 75.

Figure 2:
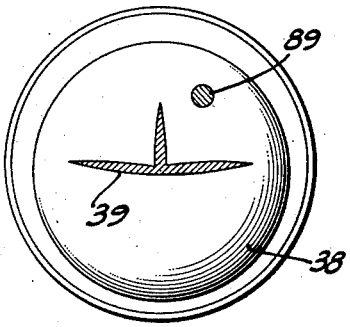
Fig. 2 is a view looking into the face or screen of the oscilloscope employed as the pilot's indicating instrument showing a vignette representing the empennage of the plane and showing the indicating spot representing the aiming direction of the gun.
Figure 3:
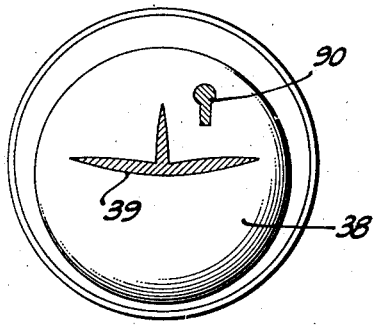
Fig. 3 is a view similar to Fig. 2 but illustrating the spot appearance when the gun is aimed in the forward hemisphere.

In order that the pilot may be apprised of whether or not the gun is being trained in a forward hemisphere or a rearward hemisphere, there is provided means for changing the character of the spot produced on the cathode ray tube screen from a simple round spot such as is represented at 89 in Fig. 2 when the gun is directed in the rear hemisphere to a keyhole-shaped spot such as that represented at 90 in Fig. 3 when the gun is pointed in the forward hemisphere. This is accomplished by means of a modulating transformer 91 and associated rectifier 92. The modulating transformer 91 includes a primary winding 93 connected to the source of power represented by conductors 40 and 41. The secondary winding 94 of the transformer has one terminal connected to the cathode of the rectifier 92 and the other terminal connected through a bias resistance 95 and by-pass condenser 96 therefor to one anode of the rectifier 92. This anode is also returned to ground through a load resistance 97.

The voltages developed across the resistances 95 and 97 are coupled through a coupling condenser 98 and conductors 99 and 100 to the conductor 88 which is connected to the vertical deflection plate 75. The operation of the circuit thus far described is to develop across the bias resistance 95 a half-wave rectified potential which is applied through the condenser 98 and conductors 100 and 88 to the vertical deflection plate 75 to cause a movement of the spot in the vertical plane producing the keyhole-shaped configuration represented in Fig. 3.

This is, by preference, intended to represent the directing of the gun in the forward hemisphere. Provision is, therefore, made for rendering the modulating rectifier 92 inoperative during the time the gun is pointing in a rearward hemisphere. This is accomplished by connecting the other anode of the rectifier 92 as by conductor 101 to the midpoint between resistors 54 and 55. With this connection resistances 55, 95 and 97 form the load resistance. Since the phase of the voltage drop across the resistance 55 reverses at the time the gun crosses the equator from the forward to the rearward hemisphere, the direct potentials produced by the rectification of this voltage opposes that normally developed in the resistance 95 at the time the gun is directed in the rearward hemisphere, thus preventing the vertical modulation of the cathode ray beam to thereby produce the round spot represented at 89 in Fig. 2.

It is also believed desirable to provide a means of indicating to the pilot whether or not the gun is being aimed with the intention of firing or is merely tracking an enemy which is out of range. This is accomplished by providing a switch 102 connected between conductors 82 and the point of common connection between potentiometers 72 and 73, the switch 102 being placed in a position to be controlled by the gunner. When closed, the switch alters the potential on the focusing grid 77 and de-focuses the cathode ray beam so that the spot produced on the screen is large, dim and relatively indistinct. When the gun is prepared for firing or is actually fired, the switch 102 is opened so that the proper focusing potential as obtained through adjustment of the potentiometer 72 is applied to the focusing grid 77 to thereby produce the sharp, round and distinct spot indicative of the use or immediate intended use of the gun.

In the foregoing reference has been made to moving the cathode ray spot in correspondence with movements of the gun. This is the mode of operation resulting from the switches 36 and 37 being thrown to the positions opposite to that shown in Fig. 4. If the switches are thrown to the position shown in Fig. 4, then the cathode ray spot moves in correspondence with movements of the sight.

From the foregoing it will be apparent that there has been provided a novel indicating system particularly adapted for use as a pilot's indicator to inform him of the operative condition and direction of training of relative movable guns particularly with respect to the empennage of the plane. The provision of such a device makes it possible for the pilot to tactically cooperate with the gunner and thus effectively increase the fire power of the craft.

Provision has been made for indicating to the pilot whether the gun is pointing in a forward hemisphere or an aft hemisphere and for indicating also whether the gun is in use or in immediate contemplated use or, alternatively, whether the gunner is merely tracking an approaching target.

Whereas the application of this invention is illustrated with reference to a gun turret operated by a gunner in an aeroplane piloted by a pilot, the broader scope of this invention covers more generally the remote indication of a multidimensional variable, for instance the direction of a vector, of a sighting device or of any mechanical apparatus movable in two or more dimensions or coordinates. It lends itself particularly well to the transmission of quantitative information about a two dimensional motion and in addition thereto of some qualtitative or discriminatory information.

While there has been shown and described the preferred embodiment of this invention, the same is not to be limited to any of the details of construction shown or described herein, except as defined in the appended claims.

What is claimed as new is:

1. In an aircraft provided with an empennage, a movable gun mounted forward of said empennage and adapted to fire in a rearward hemisphere including said empennage and in a forward hemisphere, means for moving said gun in azimuth and elevation in both hemispheres, remote control means for causing said gun moving means to aim said gun at different points in either hemisphere, said remote control means being adapted to transmit signals to said gun moving means to control the operation thereof, indicating means located within the range of vision of the pilot of said aircraft, said last named means having a screen representing either hemisphere, a vignette simulating said empennage on said screen, means for producing a visible spot on said screen to indicate the point at which the gun is aiming in a hemisphere, means adapted to receive the signals transmitted by said remote control means and move said spot on said screen in accordance with the aiming of said gun as caused by said gun moving means in response to said same signals transmitted by said remote control means, and means acting to change the appearance of said spot on said screen to indicate the movement of said gun in the forward hemisphere and automatically operative during said movement.

2. In an aircraft provided with an empennage, a movable gun mounted forward of said empennage and adapted to fire in a rearward hemisphere including said empennage and in a forward hemisphere, means for moving said gun in azimuth and elevation in both hemispheres, remote control means for causing said gun moving means to aim said gun at different points in either hemisphere, said remote control means being adapted to transmit signals to said gun moving means to control the operation thereof, a cathode ray oscilloscope located within the range of vision of the pilot of said aircraft, said oscilloscope having a screen representing either hemisphere, a vignette simulating said empennage on said screen, means for producing a luminous spot on said screen to indicate the point at which the gun is aiming in a hemisphere, means adapted to receive the signals transmitted by said remote control means and control said oscilloscope to move said spot on said screen in accordance with the aiming of said gun as caused by said gun moving means in response to said same signals transmitted by said remote control means, and means acting on said oscilloscope to change the appearance of said luminous spot on said screen to indicate the movement of said gun in the forward hemisphere and automatically operative during said movement.

3. In an aircraft provided with an empennage, a movable gun mounted forward of said empennage and adapted to fire in a rearward hemisphere including said empennage and in a forward hemisphere, means for moving said gun in azimuth and elevation in both hemispheres, a Selsyn transmitter operable by the gunner, and a second Selsyn transmitter actuated by said moving gun, said transmitters being adapted to cooperatively produce and transmit signals to actuate said gun moving means, indicating means located within the range of vision of the pilot of said aircraft, said last named means having a screen representing either hemisphere, a vignette simulating said empennage on said screen, means for producing a visible spot on said screen to indicate the point at which the gun is aiming in a hemisphere, means adapted to receive the signals produced by movement of at least one of said Selsyn transmitters relative to a reference position and move said spot on said screen relative to a corresponding reference position in accordance with the aiming movement of said gun relative to a corresponding reference position as caused by said gun moving means in response to said signals produced cooperatively by said Selsyn transmitters, and means acting to automatically change the appearance of said spot on said screen when said gun moves from the rearward to the forward hemisphere.

4. In an aircraft provided with an empennage, a movable gun mounted forward of said empennage and adapted to fire in a rearward hemisphere including said empennage and in a forward hemisphere, means for moving said gun in azimuth and elevation in both hemispheres, a Selsyn motor operatively associated with the movement of said gun in aiming at different points in either hemisphere and adapted to transmit signals in direct relation to said aiming movement, a cathode ray oscilloscope located within the range of vision of the pilot of said aircraft, said oscilloscope having a screen representing either hemisphere, a vignette simulating said empennage on said screen, means for producing a luminous spot on said screen to indicate the point at which the gun is aiming in a hemisphere, means adapted to receive the signals produced by said Selsyn motor and move said spot on said oscilloscope screen in accordance with the aiming of said gun as caused by said gun moving means in response to said same signals produced by said Selsyn motor and means acting on said oscilloscope to change the appearance of said luminous spot on said screen to indicate the movement of said gun in the forward hemisphere and automatically operable during said movement.

5. In an aircraft provided with an empennage, a movable gun mounted forward of said empennage and adapted to fire in an area including said empennage, means for moving said gun in azimuth, means for moving said gun in elevation, remote control means for causing both said gun moving means to cooperate in aiming said gun at a given point in said firing area, said remote control means being adapted to transmit signals to said gun moving means to control the operation thereof, and an indicator located within the range of vision of the pilot of said aircraft, said indicator being adapted to receive said signals transmitted by said remote control means and indicate to said pilot that movement of said gun relative to said empennage which is designed to be caused by said gun moving means in response to said same signals.

6. In an aircraft provided with an empennage, a movable gun mounted forward of said empennage and adapted to fire in an area including said empennage, power means for moving said gun, remote control means for transmitting signals to actuate said power means, follow-up means actuated by said moving gun and adapted to transmit signals to said power means in accordance with the extent of response of the moving gun to said first mentioned signals, and a receiving means in the form of an indicator located within the range of vision of the pilot of said aircraft adapted to receive signals from at least one of said transmitting means and indicate to said pilot the movement of said gun relative to said empennage as driven by said power means in response to said same signals.

7. In an aircraft provided with an empennage, a movable gun mounted forward of said empennage and adapted to fire in an area including said empennage, power means for moving said gun in azimuth, power means for moving said gun in elevation, gunner operated means for controlling both said power means, said last named means including both Selsyn transmitters operable by the gunner and Selsyn transmitters synkinesized with the gun and being adapted to transmit signals to said power means in controlling the operation thereof, and indicating means located within the range of vision of the pilot of said aircraft, said indicating means being adapted to receive said signals emanating from said Selsyn transmitters and indicate to said pilot the movement of said gun relative to said empennage as driven by said power means in response to said same signals.

8. In an aircraft provided with an empennage, a movable gun mounted forward of said empennage and adapted to fire in an area including said empennage, power means for moving said gun in elevation, a pair of cooperative Selsyn transmitters adapted to cooperate to send signals in accordance with their relative position for controlling said power means, second power means for moving said gun in azimuth, a second pair of cooperative Selsyn transmitters adapted to cooperate to send signals in accordance with their relative position for controlling said second power means, and indicating means located within the range of vision of the pilot of said aircraft, said indicating means being adapted to receive signals produced by movement from a reference position of at least one Selsyn transmitter of each pair and indicate to said pilot the movement of said gun relative to said empennage from a corresponding reference position as driven by both said power means in response to said cooperatively produced signals.

9. In a device for indicating to the pilot of an aircraft the position relative to an empennage of a remotely located flexible gun movable in azimuth and elevation through two hemispheres by a moving means including three-phase electrically coupled rotor and stator apparatus for controlling the movement of said gun through the transmission of signals created by movement of the rotors of said apparatus relative to the stators thereof, indicating means adapted to pick up said signals as are used in the control of said gun's movements, said same signals actuating said indicating means in a manner such that the pilot is informed thereby of the gun's movement relative to said empennage in both hemispheres, and means operable by said signals and actuating said indicating means to differentiate between the hemispheres.

10. In a device for indicating to the pilot of an aircraft the operation and movement relative to an empennage of a remotely located gun on said aircraft operated by power means for aiming the gun including apparatus operable by a gunner for controlling the aiming movement of said gun through the transmission of signals for the control of said power means, indicating means adapted to pick up said signals as are used in the control of said gun's movements, said same signals actuating said indicating means in a manner such that the pilot is informed thereby of the gun's movement relative to said empennage, and means under the control of the gunner and actuating said indicating means to differentiate between idle aiming of the gun and aiming of the gun in actual combat.

11. In a device for indicating to the pilot of an aircraft the operation of a remotely located flexible gun movable in azimuth and elevation, power means for aiming the gun, a Selsyn transmitter synkinesis system operable by the gunner to control said power means through the transmission of signals created by relative movement of the rotors of said system relative respectively to the stators thereof, a cathode ray oscilloscope located within the range of vision of the pilot, said oscilloscope having a screen, means for producing a visible spot on said screen to indicate the point at which the gun is aiming, means for focusing and unfocusing said spot on said screen, means adapted to receive the signals created by movement of the rotors at one end of said system relative to a reference position and move said spot on said screen in accordance with the movement of said gun with reference to a corresponding reference position, and means accessible to said gunner for causing said focusing means to change the appearance of said spot to indicate when the gun is in use in actual combat.

12. In a military vehicle mounting a gun movable with respect to a fixed part of said vehicle and adapted to fire in a given area, remote control means for transmitting signals to cause movement of said gun in said firing area, and indicating means located within the range of vision of the operator of said vehicle, said indicating means being adapted to receive said signals transmitted by said remote control means and indicate to said vehicle operator the movement of said gun relative to said fixed part designed to be caused by said remote control means.

13. In a device for indicating to the pilot of an aircraft the movement of a remotely located turret in azimuth and the elevational movement of a gun in the turret, a pick-up device adapted to be influenced by and responsive to the respective movements of the turret and gun, a converter sensitive to the reaction of said pick-up device as influenced by the movements of said turret and gun and adapted to transform said reactions into electrical quantities, an indicator located within the range of vision of the pilot capable of registering with an indicating spot the two components of motion in response to the impulses relayed thereto by said converter, modulators to change the appearance of said indicating spot in order to convey additional information, and means for actuating said modulators for imparting code signals to said indicator without interfering with its function as a position indicator.

14. In a device for indicating to the pilot of an aircraft the position relative to a fixed part of said aircraft of a remotely located flexible gun movable in azimuth and elevation by gun moving means including inductively coupled rotor and stator apparatus for controlling the movement of said gun through the transmission of signals created by movement of the rotors of said apparatus relative to the stators thereof, and indicating means adapted to pick up said signals as are used in the control of said gun's movements, said same signals actuating said indicating means in a manner such that the pilot is informed thereby of the gun's movement relative to said fixed part.

WOLFGANG B. KLEMPERER.